US011435728B2

(12) United States Patent
Enver

(10) Patent No.: US 11,435,728 B2
(45) Date of Patent: Sep. 6, 2022

(54) I/O VIRTUALIZATION FOR COMMISSIONING

(71) Applicant: FISHER-ROSEMOUNT SYSTEMS, INC., Round Rock, TX (US)

(72) Inventor: Alper T. Enver, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1014 days.

(21) Appl. No.: 16/146,371

(22) Filed: Sep. 28, 2018

(65) Prior Publication Data

US 2019/0101899 A1  Apr. 4, 2019

Related U.S. Application Data

(60) Provisional application No. 62/567,110, filed on Oct. 2, 2017.

(51) Int. Cl.
*G05B 19/418* (2006.01)

(52) U.S. Cl.
CPC ........... *G05B 19/4184* (2013.01); *G05B 2219/31121* (2013.01); *G05B 2219/33286* (2013.01)

(58) Field of Classification Search
CPC .......... G05B 19/418; G05B 19/4184; G05B 2219/31121; G05B 2219/33286;

(Continued)

(56) References Cited

U.S. PATENT DOCUMENTS 8,332,193 B2 * 12/2012 McKim ................ C09B 9/00
700/29
8,825,183 B2 * 9/2014 Hammack .......... G05B 19/409
700/17

(Continued)

FOREIGN PATENT DOCUMENTS

GB     2 555 509 A    5/2018

OTHER PUBLICATIONS

Search Report for Application No. GB1815953.3, dated Mar. 22, 2019.

*Primary Examiner* — Tung S Lau
(74) *Attorney, Agent, or Firm* — Marshall, Gerstein & Borun LLP

(57) ABSTRACT

Disclosed herein are techniques for virtualizing the I/O of control modules that are to be implemented by a process controller in the runtime environment of a process plant. A configuration application identifies references to the I/O objects utilized by the control modules. In response, the configuration application generates virtual device signal tags (DSTs) to mimic the performance of the identified I/O objects. To facilitate testing and/or verification of the control module, e.g., during the commissioning of a back-end environment, the configuration application instantiates a virtual controller in a simulation environment. To generate the virtual controller, the configuration application replaces any references to the I/O objects with references to respective, generated virtual DSTs. Thus, by using the virtual DSTs as a proxy for the I/O to the field devices, the control module and/or controller may be tested prior to the field devices without the field environment being fully commissioned.

18 Claims, 9 Drawing Sheets

(58) Field of Classification Search
CPC ........... G05B 2219/32355; G05B 2219/50123; G05B 19/4188; G05B 19/41885; Y02P 90/02

See application file for complete search history.

(56) References Cited

U.S. PATENT DOCUMENTS

| | | | |
|---|---|---|---|
| 9,904,268 B2* | 2/2018 | Blevins | G05B 19/0428 |
| 11,137,745 B2* | 10/2021 | Nixon | G06F 13/364 |
| 2007/0165031 A1* | 7/2007 | Gilbert | G06F 8/20 |
| | | | 345/473 |
| 2007/0168060 A1* | 7/2007 | Nixon | G06N 5/04 |
| | | | 700/83 |
| 2009/0089031 A1 | 4/2009 | Sturrock et al. | |
| 2010/0168874 A1* | 7/2010 | Lucas | H04L 67/28 |
| | | | 700/17 |
| 2011/0230980 A1* | 9/2011 | Hammack | G05B 19/409 |
| | | | 700/17 |
| 2015/0134317 A1 | 5/2015 | Maturana et al. | |

\* cited by examiner

I/O VIRTUALIZATION FOR COMMISSIONING

CROSS-REFERENCE TO RELATED APPLICATIONS

This application claims priority to and the benefit of the filing date of U.S. Provisional Patent Application No. 62/567,110, filed on Oct. 2, 2017, entitled "I/O VIRTUALIZATION FOR COMMISSIONING," the entire disclosure of which is hereby expressly incorporated by reference herein.

FIELD OF THE DISCLOSURE

The present disclosure relates generally to process plants and process control systems, and more particularly, to virtualizing I/O components of a process control system to facilitate commissioning of a controller.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, are disposed between a controller and one or more field devices, and enable communications there between, e.g. by converting electrical signals into digital values and vice versa.

Information from the field devices and the controller is usually made available over a communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The communication network utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a communication network to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the communication network), receive data from the controller application via the communication network and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the communication network while a configuration database application may run in a still further computer attached to the communication network to store the current process control routine configuration and data associated therewith. Alternatively, the configuration database may be located in the same workstation as the configuration application.

Generally, the commissioning of a process plant or system involves bringing various components of the plant or system to the point where the system or plant can operate as intended. As is commonly known, physical process elements (such as valves, sensors, etc. that are to be utilized to control a process in a process plant) are installed at respective locations within the field environment of the plant, e.g., in accordance with Piping and Instrumentation Diagrams (P&IDs) and/or other plans or "blueprints" of the plant floor layout and/or of the process layout. After the process elements have been installed, at least some of the process elements are commissioned. For example, process controllers, I/O cards or devices, field devices, sampling points, and/or other elements are subject to being commissioned. Commissioning is an involved and complex process which typically includes multiple actions or activities. For example, commissioning may include actions or activities such as, inter alia, verifying or confirming an identity of an installed process control device (such as a field device, a controller, or an I/O device or card interconnecting a field device and a controller) and its expected connections; determining and providing tags that uniquely identify the process control device within the process control system or plant; setting or configuring initial values of parameters, limits, etc. for the device; verifying the correctness of the device's installation, operation and behaviors under various conditions, e.g., by manipulating signals provided to the devices and performing other tests, and other commissioning activities and actions. Device verification during commissioning is important for safety reasons, as well as to conform to regulatory and quality requirements.

Typically, the commissioning of a process plant requires physical devices, connections, wiring, etc. to be installed, set up, and inter-connected in the field environment of the process plant. At the back-end environment of the plant (e.g., at the centralized administrative computing devices such as operator workstations, personal computers or computing devices, centralized databases, configuration tools, etc. that are typically placed in control rooms or other locations away from the harsher field environment of the plant), data that specifically identifies and/or addresses the various devices, their configurations, and their interconnections is integrated, verified or commissioned, and stored.

Other commissioning actions or activities may relate to a process controller implementing a control routine in a process control loop that includes one or more I/O devices and one or more field devices. Such commissioning actions or activities include, for example, verifying that various signals sent across various interconnections between devices included in the process control loop result in expected behavior at both ends of the interconnection, integrity checks on the process control loop, generating as-built I/O lists to indicate the actual physical connections of the devices that are implemented within the loop, as well as recording other "as-installed" data, to name a few.

Traditionally, to commission control routines or strategies that are to execute during runtime in process controllers, the back-end operator downloads test or simulation logic into a controller disposed in the field or front-end environment, downloads the subject control routine or strategy (which may be implemented as one or more control modules, for example) into the controller, and executes the downloaded simulation logic to verify the executing behavior of the subject control routine. In one example, downloaded simulation logic includes a simulation module interconnected to an input of the controller. However, as the simulation control routine is downloaded into the controller, this portion of the commissioning process requires, as pre-conditions, the physical path between the back-end environment and the controller to be commissioned, and/or the I/O devices and field devices associated with the controller to be commissioned. Thus, in some aspects, the commissioning of the signaling paths of the process plant and/or the commissioning of the I/O and field devices gates the commissioning of the control routine, thereby extending the time it takes to commission a process plant.

Additionally, as the field engineer commissions the field devices within the field environment, the field engineer may assign newly commissioned field devices to the controller. Similarly, the field engineer may modify a field device that was already assigned to the controller, such as by assigning the field device to a different controller. Accordingly, the back-end operator must adjust and re-download the control routine into the controller to account for these and similar changes when conducting simulations and testing of control routines and loops during commissioning.

SUMMARY

Techniques, systems, apparatuses, components, devices, and methods for virtualizing input/output (I/O) (e.g., for virtualizing I/O blocks and/or other portions of an I/O device) to facilitate controller commissioning are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes (also referred to herein as "industrial processes") that operate to manufacture, refine, or transform, raw physical materials to generate or produce products.

I/O virtualization during the commissioning of process control systems and/or plants include various techniques, systems, apparatuses, components, and/or methods that allow for at least some portions of the commissioning process to be performed asynchronously, so that controllers and devices controlled by controllers may be partially or even entirely commissioned prior to being incorporated or integrated into the plant or system as a whole. I/O virtualization during commissioning allows, for example, various portions of process control systems and/or their respective safety instrumented systems (SIS) (e.g., stand-alone or integrated safety systems (ICSS)) or basic process control systems (BPCS) to be built and at least partially commissioned at different geographical locations (e.g., at different "mod yards") prior to being brought together and integrated at the resident location or site of the process plant. In a sense, I/O virtualization allows for parallel commissioning activities and actions to take place.

For example, I/O virtualization allows for some (if not most) commissioning activities and/or actions to be performed independently (and indeed, in parallel, if desired) in the field environment and in the back-end environment of the process plant. Commissioning of the design and engineering implemented in the field environment no longer is dependent on the progress (and completion) of the functional design, engineering, and commissioning being performed and mostly completed in the back-end environment. As such, a significant portion of the commissioning of the functional or logical components of the back-end environment are able to be performed independently of local commissioning activities of the physical components of the field environment, and vice versa. That is, at least some portion of commissioning activities and actions in either the field environment or the back-end environment may be performed while the field environment and the back-end environment are communicatively disconnected, e.g., while a loop (or portion thereof) that has been (or is being)

installed in the field environment is communicatively disconnected from the back-end environment. For instance, using I/O virtualization techniques, at least some of portion of the commissioning activities and actions in the field environment and/or in the back-end environment are able to be performed prior to the process control system or plant having knowledge of the assignment of a field device to a particular I/O card and/or channel and/or the assignment of a process controller to a particular I/O card and/or channel.

Similarly, with regard to process controllers that implement control routines in process plants, I/O virtualization allows for various commissioning activities and/or actions related to the controller to be performed without requiring that all of the components included in a control loop to first be installed and interconnected. For example, a virtual I/O object may be generated to simulate, e.g., to a control routine, the I/O of a component (e.g., of an I/O device, a field device, etc.) that has not been commissioned yet. Accordingly, at least some portion of the commissioning activities of a controller that implements a control routine in a control loop may be performed while various components of the control loop are disconnected or not yet allocated to each other, to field devices, and/or to the back-end environment. As such, respective commissioning activities may be initiated and performed at both the back-end environment and the field environment of a process plant while the two environments are communicatively disconnected or only partially connected.

Consequently, as I/O virtualization allows for the physical design and engineering performed in the field environment of the process plant to proceed independently of the functional design and engineering performed in the back-end environment of the process plant, and as I/O virtualization also allows for piece-wise commissioning of components of a control loop to be performed independently or on an as-installed basis, commissioning scheduling dependencies between the back-end and the field are reduced, and overall calendar time that is required for commissioning the process plant is also reduced. Thus, I/O virtualization optimizes the commissioning process as a whole with significant reduction in both time and personnel resources, and therefore significant reduction in costs.

DETAILED DESCRIPTION

As discussed above, a process plant, process control system, or process control environment that, when on-line, operates to control one or more industrial processes in real-time may be commissioned utilizing one or more of the I/O virtualization techniques, systems, apparatuses, components, devices, and/or methods described herein. The process plant, when commissioned and operating on-line, includes one or more wired or wireless process control devices, components, or elements that perform physical functions in concert with a process control system to control one or more processes executing within the process plant. The process plant and/or process control system may include, for example, one or more wired communication networks and/one or more wireless communication networks. Additionally, the process plant or control system may include centralized databases, such as continuous, batch, asset management, historian, and other types of databases.

Figure 1:
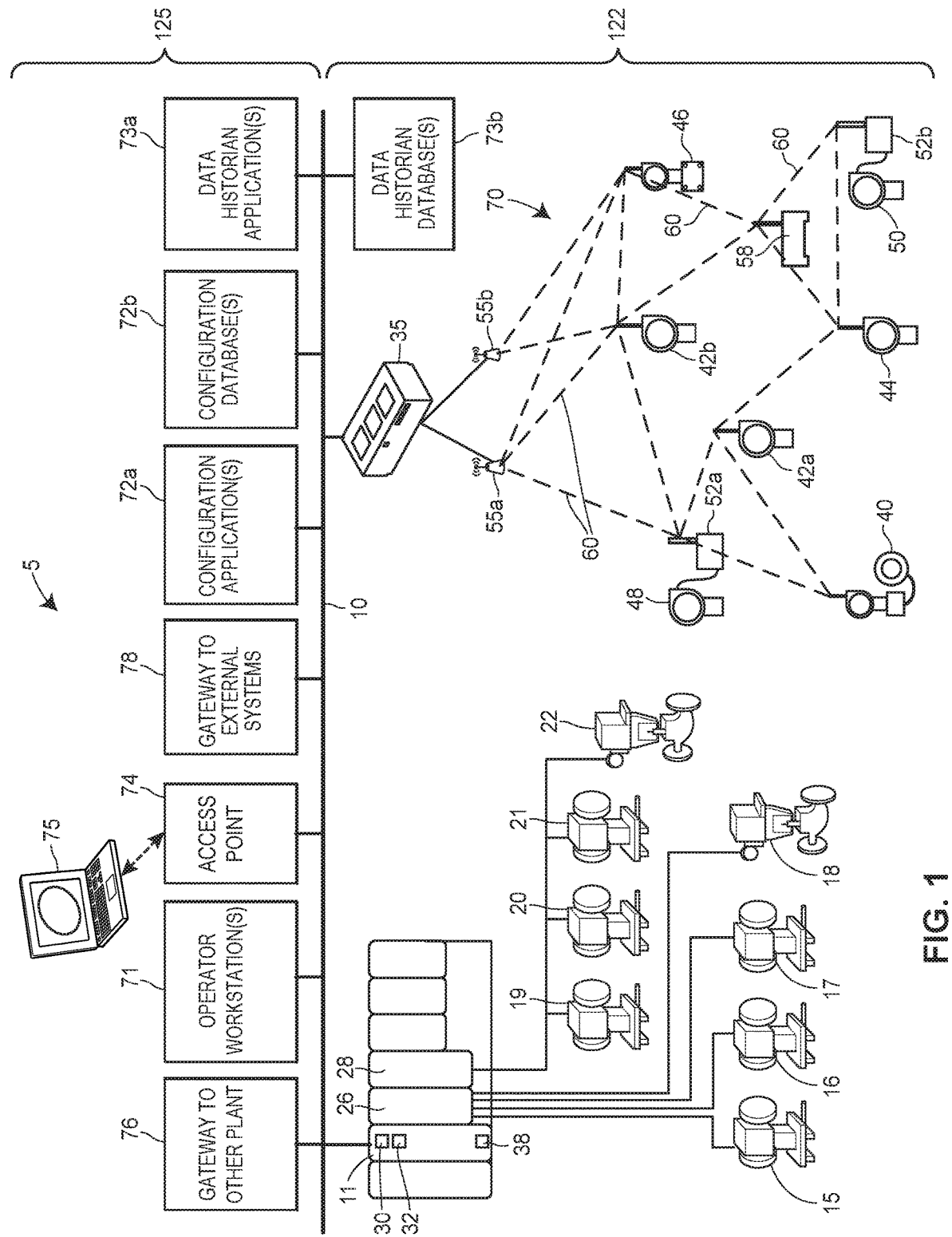
FIG. 1 depicts a block diagram illustrating an example system process plant, at least a portion of which may be commissioned by utilizing one or more of the I/O virtualization techniques described herein.

To illustrate, FIG. 1 is a block diagram of an example process plant, process control system, or process control environment 5, at least a portion of which has been commissioned by using any one or more of the I/O virtualization techniques described herein. The process plant 5 includes one or more process controllers (which are also referred to interchangeably herein as "controllers") that receive signals indicative of process measurements made by field devices, process this information to implement a control routine, and generate control signals that are sent over wired or wireless process control communication links or networks to other field devices to control the operation of a process in the plant 5. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices (which are also referred to interchangeably herein as "I/O cards." Process controllers, field devices, and I/O devices may be wired or wireless, and any number and combination of wired and wireless process controllers, field devices and I/O devices may be included in the process plant environment or system 5.

For example, FIG. 1 illustrates a process controller 11 that is communicatively connected to wired field devices 15-22 via I/O cards 26 and 28, and that is communicatively connected to wireless field devices 40-46 via a wireless gateway 35 and a process control data highway or backbone 10. The process control data highway 10 may include one or more wired and/or wireless communication links, and may be implemented using any desired or suitable or communication protocol such as, for example, an Ethernet protocol. In some configurations (not shown), the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any process control routines or modules described herein may have parts thereof implemented or executed by different controllers or other devices if so desired. Likewise, the process control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a process control strategy or control routine 38 using what are commonly referred to as function blocks, where each function block is an object or other part (e.g., a subroutine) of an overall control routine and operates in conjunction with other function blocks (via communications called links) to implement process control loops within the process control system 5. Control-based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops which are performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-® are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

In FIG. 1, the process control system 5 includes one or more operator workstations 71 that are communicatively connected to the data highway 10. Via the operator workstations 71, operators may view and monitor run-time operations of the process plant 5, as well as take any diagnostic, corrective, maintenance, and/or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

The example process control system 5 is further illustrated as including a configuration application 72a and configuration database 72b, each of which is also communicatively connected to the data highway 10. As discussed above, various instances of the configuration application 72a may execute on one or more computing devices (not shown) to enable users (e.g., configuration engineers) to create or change process control modules and download these modules via the data highway 10 to the controllers 11, to generate a virtual controller representative of the one of the controllers 11 for a simulation or test of draft process control modules, as well as enable users to create or change operator interfaces via which in operator is able to view data and change data settings within process control routines. The configuration database 72b stores the created (e.g., configured) modules, including template modules, control modules, display modules, and/or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, configuration database 72b, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5).

The example process control system 5 includes a data historian application 73a and data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58) also communicate using the wireless protocol supported by the access points 74.

In some configurations, the process control system 5 includes one or more gateways 76, 78 to systems that are external to the immediate process control system 5. Typically, such systems are customers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

Figure 2A:
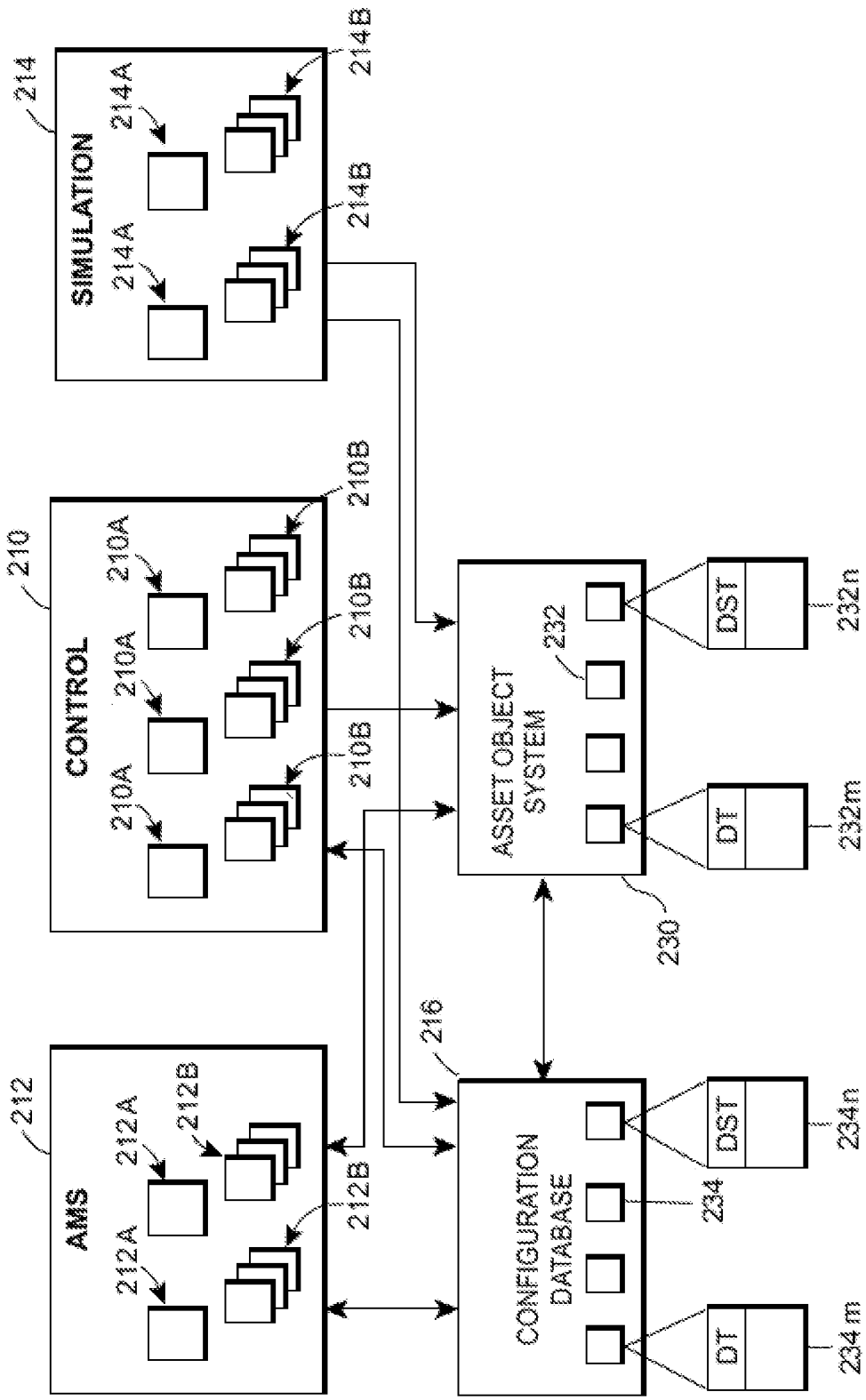
FIGS. 2A-2B illustrate views of example components within a back-end system of a process or industrial plant that provides the ability to configure and perform commissioning actions on the back-end components, such as modules, applications, and interface programs, including prior to field equipment being connected and/or allocated via I/O networks in the plant.

FIG. 2A illustrates an example back-end system 200 that includes hardware and software entities that enable back-end system components (e.g., and in particular, those back-end components related to process controllers) to be created, tested, configured and commissioned (at least partially) prior to the field equipment being connected to and/or allocated to various I/O network cards and/or channels in the plant. The back-end system 200 may be included in the back-end environment 125 of FIG. 1, in an example implementation.

More particularly, as illustrated in FIG. 2A, the back-end system 200 may include control, maintenance, and simulation systems, depicted as a control system 210, an asset management system (AMS) 212, and a simulation system 214. The control system 210, which is illustrated for the sake of simplicity as a single block, may include many different control applications and databases stored in and executed in the same or different control system processing devices, such as in the various different processing devices, user workstations, servers, and databases of FIG. 1. More particularly, the control system 210 may include one or more control system design applications 210A, such as a configuration application, which may be used to create various control modules, control function blocks, control user interface applications, and other control programs (e.g., as illustrated in FIG. 2A and as generally referred to herein as control modules 210B). As the control applications 210A may be used to facilitate commissioning activities, any of the control applications 210A, including the configuration application, may also be referred to as a "commissioning tool." The control modules 210B that are generated and/or modified by using the control applications 210A may ultimately be downloaded, stored, and executed in one or more process controllers or safety system logic devices in the field environment 122. When executing in the one or more process controllers or safety logic devices in the field environment 122 during runtime, the control modules 210B may perform control routines to implement control actions, safety system routines to implement safety actions, etc. The control user interface applications, which may be executed in one or more back-end system computer devices, such as workstations having user interfaces, etc., may enable control engineers, control operators, or other personnel to perform various control based activities in the plant. Once created, such control modules, routines, applications, and programs 210B may be downloaded to and executed in various ones of the controllers, I/O devices, field devices, databases, user interface devices, servers, processing devices, etc., of the field environment 122 of the control system during runtime of the process plant 5. Additionally or alternatively, the control modules, routines, applications, and programs may be executed by a virtual controller in a simulation environment at the simulation system 214. Moreover, the created control modules 210B (which may be made up of various interconnected function blocks, for example), safety instrumented modules, user interface modules, communication modules, analytic modules, database modules, etc., may be stored in a configuration database 216 (not shown). At some point, these control modules, programs, interfaces, etc., 210B may also be downloaded and installed in various computer processing devices, such as in process controllers, workstations, user interface devices, databases, servers, etc. during the commissioning process.

Likewise, the asset management system (AMS) 212 may include various maintenance system creation and configuration applications 212A which are used to create maintenance systems objects, user interfaces, database objects, or other applications or modules 212B, which may be stored in and executed in various devices in the plant to perform maintenance activities in the plant, including in user workstation devices, handheld devices, portable computing devices, etc. The modules, objects, programs, and applications 212B may be run by or in conjunction with other maintenance system components, and may be run on various platforms or devices, such as back-end system devices, handheld or portable devices that can be moved within the plant, etc. Moreover, these modules, applications, programs, interfaces, etc., may be used to perform any desired or known types of maintenance activities on the devices within the process or industrial plant, including on devices in the control system and the safety instrumented system of the plant. As illustrated in FIG. 2A, the components of the AMS system 212 may be connected to and may store information and receive information from the configuration database 216, and may operate to update or change data, objects, or other information in the configuration database 216 during operation of the plant.

Still further, the back-end environment 200 of FIG. 2A is illustrated as including a simulation system 214 that may include various applications 214A that may be used to test various ones of the control modules 210B, safety modules 210B, communication modules 210B, asset management system modules 212B, user interface applications 210A and 212A, etc. that are developed using applications 210A and 212A within the control system 210, and the AMS 212, and/or that are stored in the configuration database 216. In some cases, the simulation system applications 214A may be used to create a simulation environment for executing a virtual controller to test and develop control modules and/or control routines as part of the commissioning of the control modules 210B and/or of their respective controllers 262. In FIG. 2A, the simulation components that are created by using the simulation system applications 214A (such as the simulation environment, the one or more virtual controllers, etc.) are indicated by the references 214B.

Figure 2B:
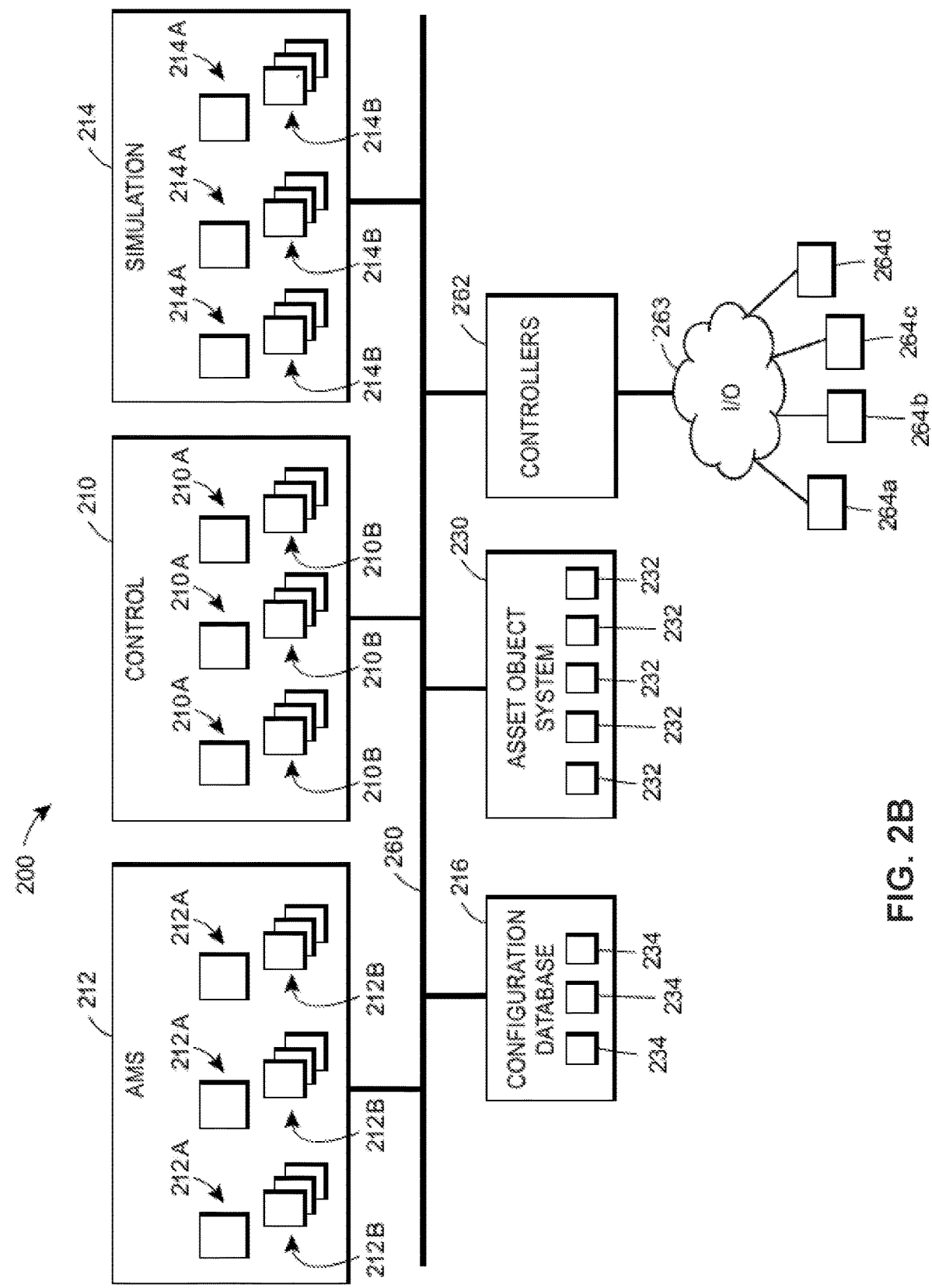

To enable commissioning activities to be performed on the software and hardware components of the back-end environment 200 prior to the back-end environment 200 being fully communicatively connected to the field equipment, and/or prior to the I/O network being configured to provide communication paths between the back-end environment 200 and the field equipment, the back-end environment 200 includes an asset object system 230 that, as illustrated in FIG. 2B, is communicatively connected to the control system 210, the AMS 212, the simulation system 214, and the configuration database 216. In some cases, the asset object system 230 may be part of the configuration database 216, e.g., may be implemented integrally with the configuration database 216. The asset object system 230 stores various device placeholder objects 232 therein, and generally stores such a device placeholder object 232m for each piece of field equipment in the field environment (e.g., each field device). The device placeholder objects for field devices or other pieces of hardware are generally indicated as a device tag (DT) placeholder object 232m. Additionally, the asset object system 230 may store a device placeholder object for each different signal or addressable parameter of a device, and these device placeholder objects are generally indicated as a device signal tag (DST) object 232n. A DST object 232n may use the same device tag as the device tag of a device to which the device signal tag corresponds as a root tag, with additional or other information included therein. Thus, the device tag 232n for a DST object may include the device tag 232m for the DT object to which the signal belongs, with additional signal tag information concatenated thereto, for example.

Generally speaking, a device placeholder object 232 is created for each of the same devices (and device signals where appropriate) as created in the field equipment environment 122 described above. Thus, the device placeholder objects 232 in the back-end environment 200 have the same format and the same types of information stored therein as device objects that are loaded in the field equipment environment 122 (where such verified device objects may be stored in back-end system 200 in the configuration database 216, for example, as objects 210B, and may be downloaded into the field environment 122 therefrom). At any rate, the device placeholder objects 232 (or instances thereof) may store I/O communication channel information, such as I/O channel properties which may be definitions, parameters, I/O device types, I/O devices, etc., that are used to communicatively connect the field device to the back-end system 200 and/or to a process controller or other device disposed in the field environment 122.

Additionally, the I/O channel properties stored in the device placeholder objects 232 may be used in a simulation executed by the simulation system 214. To this end, the I/O channel information for the field device as stored in a device placeholder object 232 provides the simulation system 214 with the ability to replicate, use, and test a device placeholder object (or an instance thereof) without the device placeholder object 232 being assigned to a particular I/O channel. Of course, the simulation system 214 still is able to replicate, use, and test device placeholder objects 232 that have been assigned to particular I/O channels.

Thus, the created objects, modules, applications, and programs 210B, 212B, 214B, that require or involve sending signals to or receiving signals from one or more of the field devices in the plant 5 may be created (as is typical) in the control system configuration applications 210A, in the maintenance system configuration applications 212A, and in the simulation system creation applications 214A, using the system tag of the field device and/or the device signal tag (which refers to a specific signal or parameter of a field device using the system tag of the field device). Typically, system tags, device tags, and/or device signal tags of field devices may be stored in the back-end system 200 in the AMS system 212 and/or in the control system 210, e.g., in the configuration database 216. A user may then use the control, maintenance, and simulation system applications 210A, 212A, 214A or a stand-alone simulation or configuration application to configure and execute the modules, objects, applications, and programs 210B, 212B, 214B, which, during execution, may use the device system tag (and/or device signal tag based on the device system tag) stored in the back-end system 200 to locate the device placeholder object 232 in the asset object system 230 for a referenced device or device signal. When the device placeholder object 232 as stored in the asset object system 230 is indicated to be in an I/O-unallocated state, the control system 210, the maintenance system 212, the simulation system 214, or other simulation or testing engine recognizes that the actual field device is not connected to the back-end system 200 via the control system I/O communications network. However, in these cases, the device placeholder object 232 may still store information about the device (and/or the I/O path or channel needed to reach the device via the I/O network) that is needed by or being referenced by the calling module, application, or program and so the device placeholder object 232 may provide a response or be used to provide a response based on the configuration data stored within the device placeholder object 232 to mimic the operation of the device or the response of the actual device, or to indicate whether the call is properly configured based on the device and I/O channel information stored about the device being addressed.

To this end, when a device placeholder object 232 is created, the device placeholder object 232 may be assigned default parameters for the type of object with which the device placeholder object is associated. For example, the configuration database 216 stores template objects for device objects made available to the applications 210A, 212A, and 214A. The template object includes the default parameters for that object type. In some embodiments, the asset object system 230 creates a copy of the template object to create the device placeholder object 232 such that the device placeholder object includes the default parameters.

In other cases, the control application 210A, the maintenance application 212A, the simulation application 214A, or a separate execution engine in, for example, the asset object system 230, upon recognizing from the device placeholder object 232 that the field device is in an I/O-unallocated device state, may create a simulated response from the field device to provide a known signal back to the requesting object to enable testing and simulation of the requesting object as if the field device were actually connected to the back-end environment 200 via the control system I/O network.

FIG. 2B illustrates a back-end system 200 having the various back-end functional systems of FIG. 2A interconnected together via one or more busses or communication networks 260 and, in particular, includes the control system 210, the asset management system 212, the simulation system, the configuration database 216, and the asset object system database 230 connected to the communication bus 260, which may be implemented using any one or more types of communication networks, such as a wired or wireless Ethernet connection, etc. Additionally, one or more process controllers 262 (which may include, for example, the process controller 11 of FIG. 1) are illustrated as being connected to the bus 260. The controllers 262 are illustrated in FIG. 2B as being connected through an I/O network 263 to various field devices or field assets 264. However, it should be noted that the I/O network 263 may not be connected to the controllers 262 during the commissioning process, or while the I/O network 263 may be connected to the controllers 262, the I/O network 263 may not yet be configured or allocated. Thus, the controllers 262 may have no understanding or indication of how to access a particular field device or field asset 264 via the I/O network 263 (e.g., because the signal path through the I/O network 263 to each such field device 264 has not yet been established or allocated). Similarly, the controllers 262 may not be able to communicate with the field devices via a configured signal path because the field devices 264 may not yet be physically connected to the I/O network 263. Thus, while the I/O network 263 and the field devices 264 are illustrated in FIG. 2B, the I/O network 263 may not actually be connected to the controllers 262 and/or ones of the various field devices 264 may not be connected to the I/O network 263 during some of the commissioning activities occurring in the back-end system 200.

Additionally, a configuration application 210A enables a configuration engineer to implement a virtual controller 214B in the simulation system 214. To this end, the configuration application 210A analyzes any control modules 210B assigned to the controller that is to be virtualized to identify any I/O objects, such as a DT 232*m* and/or a DST 232*n*, included in control routine. For each of these I/O objects, the configuration application 210A generates a respective virtual I/O object 234*m*, 234*n* that is stored in the back-end system 200, e.g., at the configuration database 216. When the configuration application 210A establishes the virtual controller simulation 214B in the simulation system 214, the configuration application 210A replaces any reference in the control modules 210B to the physical location of the I/O object 232*m*, 232*n* with a reference to the location of the corresponding virtual I/O object 234*m*, 234*n*. It should be noted that non-I/O parameters of the modules may still reference the physical path, in some embodiments.

As will be appreciated, the I/O objects 232*m*, 232*n* may be assigned to field devices that have an allocated or an unallocated I/O path. Additionally, in some control routines, the I/O device (e.g., the I/O card or other suitable hardware supporting the I/O objects 232*m*, 232*n*) may be unassigned from any field device 264. For I/O devices assigned to a field device 264 with an allocated I/O path, the configuration application 210A may generate the virtual I/O object 234 by copying a corresponding DT object or a DST object that is configured, stored in the configuration database 216, and corresponds to the assigned field device 264. On the other hand, for an I/O device assigned to a field device without an allocated I/O path or are unassigned to a device at all, the configuration application 210A may generate the virtual I/O object 234 by copying a device placeholder object 232 stored in the asset object system 230 to correspond to the yet-to-be-assigned field device 264. Alternatively, in either case, the configuration application 210A may generate the virtual I/O object 234 by copying a template object stored in the configuration database 216. It should be appreciated that because the references to the virtual I/O objects 234 are only included in the control modules 210B when implementing a virtual controller 214B, upon successful testing of subject control modules 210B via the simulation system 214, the same control module 210B can be downloaded into a controller 262 without modification.

Additionally, as illustrated in FIG. 2B, the various systems 210, 212, and 214 include configuration applications such as control applications or control module creation applications 210A, maintenance object or interface creation applications 212A, and simulation system applications 214A, which may be used during commissioning of the plant or to create various ones of the modules, objects, applications, and/or user-interface programs 210B, 212B, 214B, which will be downloaded to and potentially run in various computing devices either within the back-end system 200, such as any of those shown in FIG. 1, or which may be provided to one of the controllers 262 (or safety system logic solvers not shown) or other devices, for execution during the operation of the plant 5 when the plant 5 is operating online, i.e., after the plant 5 has been commissioned.

As will be understood, the asset object system or database 230 stores the device placeholder objects 232 for each of the field device assets 264, and thus provides configuration information about these objects to the other systems 210, 212, 214 when these placeholder objects are in an VO-unallocated device state. Similarly, the virtual I/O objects 234 stored at the configuration database 216 also provide configuration information about the field device assets 264. The use of the device placeholder objects 232 and/or virtual I/O objects 234, enables the other applications, such as the programs 210A, 212A, 214A, to complete various commissioning and testing activities on the objects, modules, applications, and programs 210B, 212B, 214B prior to the field devices 264 actually being connected or allocated through the I/O network 263 to the various controllers 262. For example, some testing activities may be conducted by a virtual controller 214B that implements the control modules 210B assigned to a controller 262.

Once the device placeholder objects 232 and/or virtual I/O objects 234 are configured, at least to some degree, for example, with such information as a device system tag, device type, and various sub-information that may be determined or based on the device type (including such sub-information provided by a user), and/or with I/O channel information pertaining to the I/O channel which will be used to communicate with the field device 264, the various other applications 210A, 212A, 214A, may use these device placeholders objects 232 and/or virtual I/O objects 234 as proxies for communicating with the actual field devices 264 or with signals within the field devices 264. Thus, the device placeholder objects 232 and/or virtual I/O objects 234 serve as proxies for the actual field devices 264 and, during the commissioning process or testing process, the other applications, such as the control, maintenance, and simulation applications 210A, 212A, 214A, which may communicate with the device placeholder objects 232 or virtual I/O objects 234 (using system, device, or device signal tags) instead of trying to communicate with the actual field devices 264 via the I/O network 263. This feature enables the applications 210A, 212A, 214A, to test the control modules created thereby using the only information they will have during online operation of those applications (i.e., the device system tag and/or the device signal tag) to perform testing, configuration, simulation, and various other commissioning activities prior to the field devices 264 being connected to the control system and allocated via the I/O network 263.

Figure 2C:
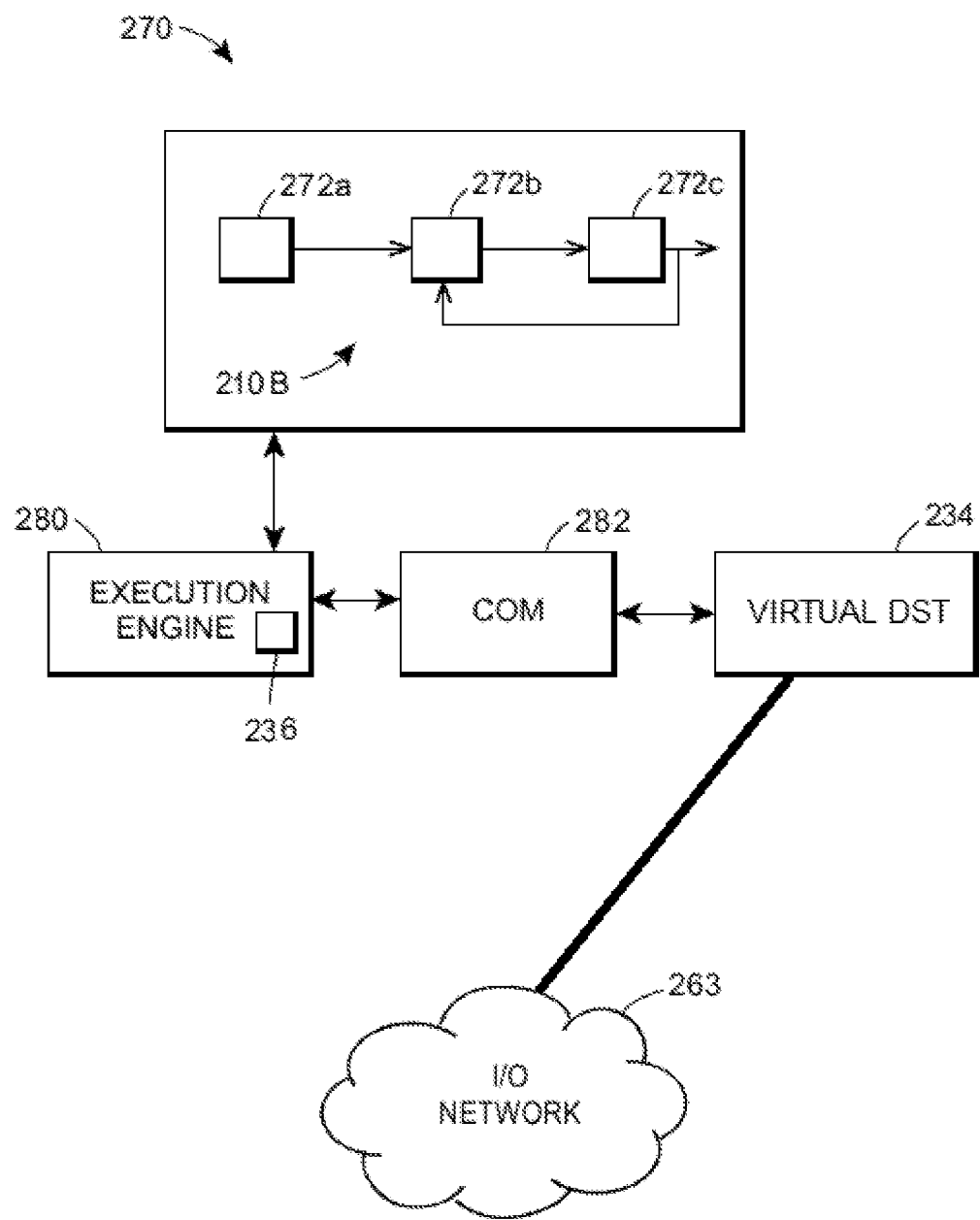
FIG. 2C depicts an example system for communicating with virtual device signal tags (DSTs) as proxies to field equipment when configuring and commissioning back-end system components prior to the field equipment being connected and/or allocated via I/O networks in the plant.

FIG. 2C illustrates a simulation or testing system 270 that may operate in conjunction with one of the control applications 210A used to simulate or test the operation of one or more control modules 210B via a virtual controller 236, to thereby enable testing of control objects or modules 210B in the back-end environment 125 or back-end system 200 prior to those modules or objects being downloaded to a controller 262 in the field environment 122 (or to one or more field devices 264 to be connected to a controller 262 responsible for the control module being tested). In particular, the system 270 of FIG. 2C is illustrated as executing and testing a control module 210B made up of a set of interconnected function blocks 272a, 272b, 272c, interconnected with communication links, with the control module 210B being part of the control system 210. Additionally or alternatively, the system 270 executes and tests other modules, applications, programs, objects, etc., associated with other systems in the back-end system 200, such as the asset management system 212 and the simulation system 214.

In any event, the system 270 includes an execution engine 280 that, in turn, executes each of the function blocks 272a-272c of the control module 210B and provides communications between these function blocks 272a-272c as defined by the communication links. It should be noted that the execution engine 280 can be a computer processing device that implements any one of the applications 210A, 212A, 214A, or a processor running a dedicated simulation or testing application designed for commissioning purposes (which may be different than the simulation applications 214A). Thus, the execution engine 280 may be part of the control system 210, the asset management system 212, the simulation system 214, etc., or the execution engine 280 may be a stand-alone component designed or dedicated to implementing testing and commissioning activities. Moreover, the execution engine 280 may be implemented anywhere (in any desired computing device) in the back-end system 200 as long as the execution engine 280 is communicatively coupled to the asset object system 230 and the database 216.

In any event, during the execution of a particular function block 272 that requires communication with a field device or other field asset, the execution engine 280 calls or uses a communication interface 282 to interface with the field device using, for example, a system tag of the field device (which is common for control, maintenance, and simulation modules). As described above, when implementing the virtual controller 236, the configuration application 210A configures any reference by one of the function blocks 272a-272c to a DT or DST to a reference to a respective virtual I/O object 234 stored in the configuration database 216. Thus, the execution engine 280 uses the communication path for the virtual I/O object 234 to execute a reference to an I/O device included in the control module 210B.

To this end, the execution engine 280 does not know (or need to know, for that matter) the communication path (i.e., the I/O network path) needed to reach the field device 264 in the field environment 122 and/or whether or not the path has or has not yet been commissioned. Rather, the execution engine 280, via the communication interface 282, sends a request (e.g., to the configuration database 216) to access configuration information and/or the I/O channel for the field device via its virtual I/O object 234. The communication interface 282 retrieves that desired or needed information stored at the virtual I/O object 234 and provides that information back to the execution engine 280. In some cases, the device virtual I/O object 234 may store configuration information associated with or defining the actual field device, such as device type, source (long) tag, system (short) tag, device ranges, limits, capabilities, etc. In the case in which the requested information is actually stored in the virtual I/O object 234, this information may be returned from the virtual I/O object 234 as if it were from the field device 264 itself.

Still further, in some cases, the communication interface 282 may just determine if the requested communications from control module 210B match or conform to the proper protocol or device configuration of the device or the I/O channel for the device associated with the virtual I/O object 234. This determination still enables the commissioning personnel to determine if the control module 210B is configured correctly to communicate with a particular device based on device type, device configuration parameters, I/O channel configuration parameters, etc. as stored within the virtual I/O object 234.

In other instances, however, the requested field device data may relate to non-configuration data collected by or generated by the field device based on actual operation of the field device. Accordingly, the communication interface 282 may access a simulation response block or module of the virtual I/O object 234 that may provide a simulated response for the field device to simulate the operation of the field device. The simulation response block or module may be specific to the commissioning process and may be provided as part of generating the virtual I/O object 234. In some cases, the simulation block of the virtual I/O object 234 is provided default simulation values when the virtual I/O object 234 is created. Such simulated responses may be provided by a user or a testing system, may be stored in a simulation file created for testing and commissioning purposes, may be generated on the fly by a user interfacing with a simulation application 214A, or may be provided in other manners. This simulated device response (which may be a simulated value for a device state, a device measurement, a device parameter, etc.) is provided to the execution engine 280 as if this value were a value or signal returned from the field device itself. This simulated response thereby enables further testing of the control module 210B based on pre-defined device responses. Generally speaking, the simulation block may be configured to make the virtual I/O object 234 look like a smart object or appear to be capable of providing actual device responses back to the requesting module (i.e., the module 210B being tested). In other cases, the communication interface 282 uses the simulation block of the virtual I/O object 234 to mimic operation of the device defined by the virtual I/O object 234 in some known manner for testing or simulation purposes.

In some cases, such as when at least a portion of the communication path (i.e., the I/O network path) needed to reach the field device 264 in the field environment 122 has been commissioned and/or defined (e.g., as indicated by the status of the field device's respective device placeholder object 232), the virtual I/O object 234 obtains the needed field device information at least in part directly from the commissioned portion of the I/O network path 263, and returns the information to the execution engine 280.

Of course, the back-end system 200 described with respect to FIGS. 2A-2C may include more, less, and/or alternate functionality, such as the functionality described in PCT Application Number PCT/US2016/056610, filed May 18, 2017, entitled "AUTOMATIC DISTRIBUTION OF DEVICE PARAMETERS FOR COMMISSIONING POR- TIONS OF A DISCONNECTED PROCESS CONTROL LOOP," the entire disclosure of which is hereby expressly incorporated by reference.

Figure 3:
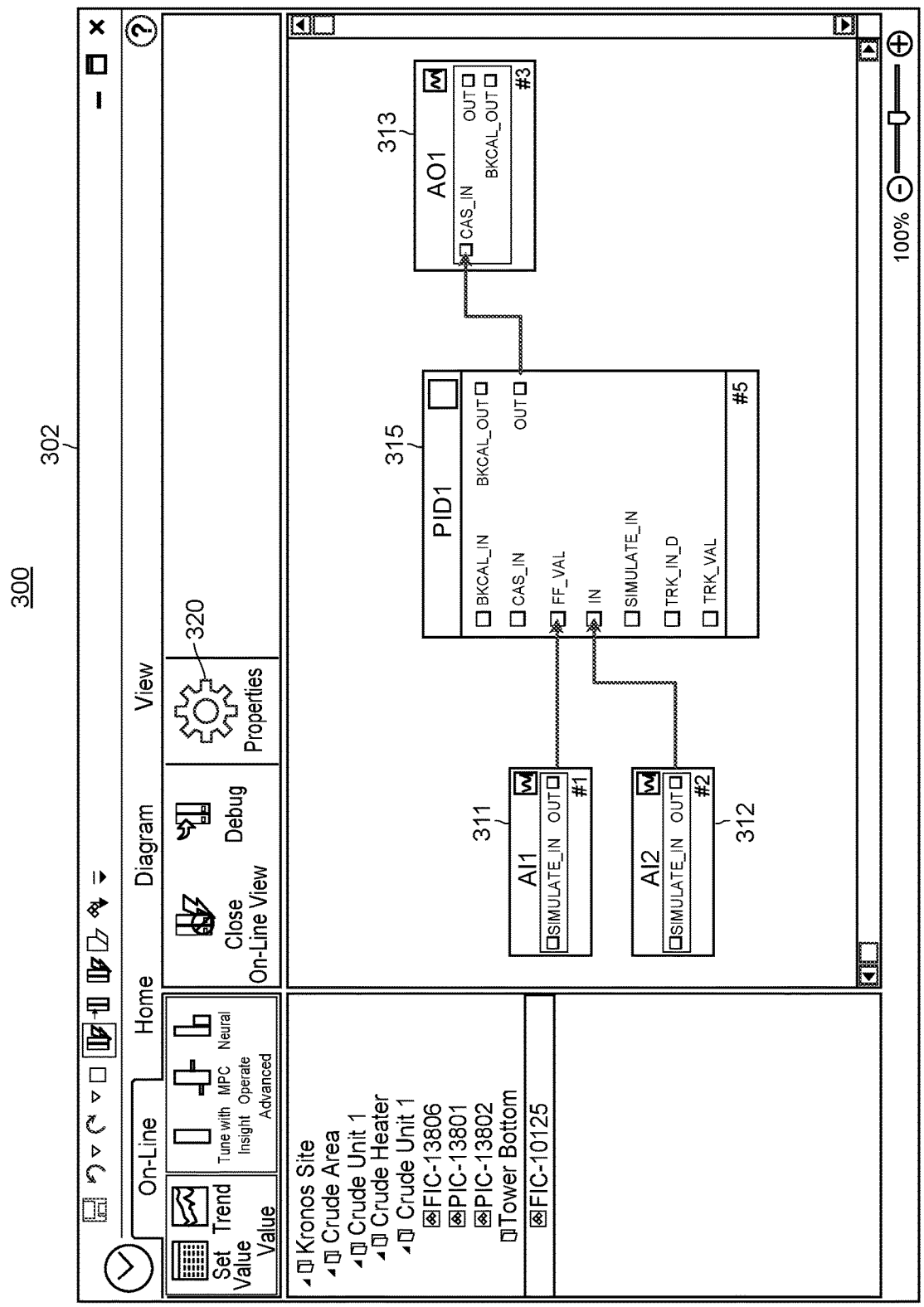
FIG. 3 illustrates an example screen display presented by the configuration application that includes indications of control routine that is to be implemented by a controller in the process plant of FIG. 1.

FIG. 3 illustrates an example screen display 302 presented by the configuration application that includes indications of a control routine (e.g., a control routine 210B) that is to be implemented by a controller in the process plant 5 of FIG. 1, e.g., the controller 11 or 262. In one example, the configuration application is one the configuration applications 72a of the back-end environment 125 of FIG. 1 and/or a control application 210A of the control system 210 of the back-end system 200 of FIG. 2.

The configuration application includes a library of template objects, such as function block template objects and, in some cases, control module template objects. These configuration applications are used to configure a control routine of a control module that is to be implemented at (e.g., executed by) a controller of the process plant during runtime. The template objects have default parameters, settings and methods associated therewith. The engineer using the configuration application can select these template objects and essentially place copies of the selected template objects into a configuration screen to develop a control module. During the process of selecting and placing the template objects into the configuration screen, the engineer interconnects the inputs and outputs of these objects and changes their parameters, names, tags and other properties to create a specific control module to execute a control routine in the process plant.

In the illustrated example, the control module includes four function blocks, a first analog input (AI) block 311, a second AI block 312, an analog output (AO) block 313, and a PID control block 315. In the illustrated control routine, the output of the first AI block 311 is interconnected to input of the FF_VAL parameter of the PID block 315; the output of the second AI block 312 is interconnected to the input of the IN parameter of the PID block 315; and the OUT parameter of the PID block 315 is interconnected to the CAS_IN parameter of the AO block 313. It should be appreciated that the engineer may assign a controller any number of control modules that implement respective control routines.

After setting up or creating the control routine for a control module, the engineer may store the created control module in the library or in a configuration data storage area, such as the configuration database 216 of FIGS. 2A-2B. The engineer can then instantiate the control module (e.g., cause an executable file corresponding to the control module to be created) and download it to the appropriate controller or controllers, field devices, and other process elements for execution during operation of the process plant. However, as described herein, during the commissioning of the process plant, the communication path between the back-end environment 125, 200 and the controller that implements the designed control routine may be disconnected. Accordingly, using at least some of the novel techniques described herein, the configuration application enables the engineer to execute each control module (that is to be implemented by a physical controller during runtime) at a virtual controller in a simulation environment, such as one executing at the simulation system 214 of FIGS. 2A, 2B e.g., for testing and/or verification purposes.

Figure 4:
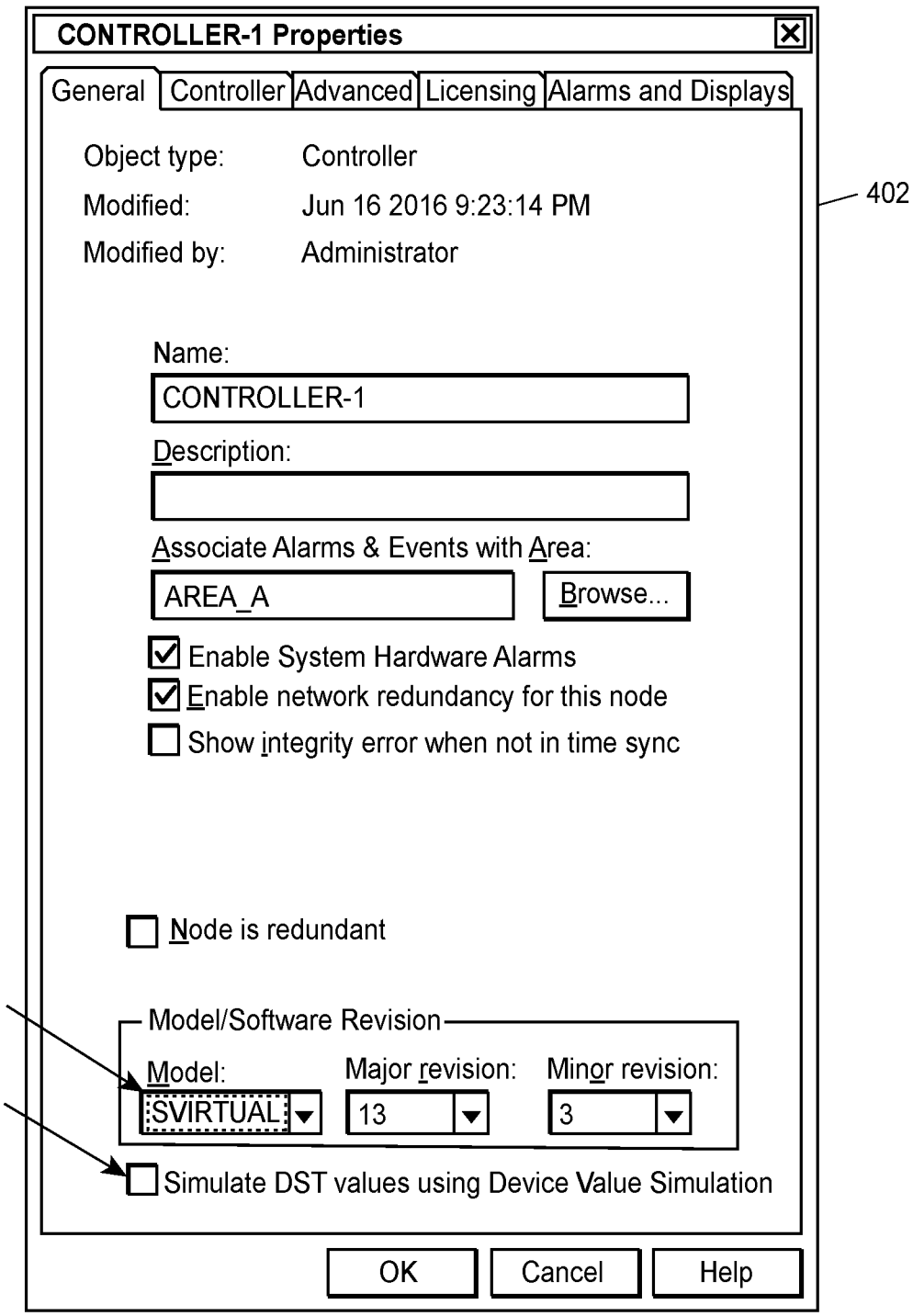
FIG. 4 illustrates an example screen display presented by the configuration application that provides user control to enable simulation of a control module of the process plant of FIG. 1.

To this end, the configuration application provides a user control 320 to modify the properties of the controller that implements the designed control module to indicate the virtual controller (and not the physical controller). FIG. 4 illustrates an example screen display 402 presented by the configuration application in response to a user input to modify controller properties via the user control 320. In one example, the engineer clicks the user control 320 presented by the screen display 302 to cause the configuration application to present the screen display 402.

The screen display 402 includes one or more user controls to configure and/or select a virtual controller. For example, a user control 422 enables the engineer to select a type of virtual controller to implement the simulation of the control routine. For example, the user control 422 enables the engineer to select the model for the virtual controller and a software version for that model. Additionally, the screen display includes a user control 424 that enables the engineer to toggle between downloading the control routine into a physical controller and executing the control routine at the virtual controller.

After the configuration application generates the virtual controller indicated by the configuration engineer via the screen 402, the engineer can simulate the various inputs into the control module, e.g., for testing and verification purposes. To this end, the engineer launches a simulation application to test the subject control module executed by the virtual controller. The simulation application may be one of the simulation applications 214A of the simulation system 214 of the back-end system 200 of FIG. 2. In one example, the configuration application includes an interface to launch the simulation application. In another example, the simulation application is a standalone application executed at, for example, a workstation 71 of the back-end system 125 of FIG. 1.

Figure 5:
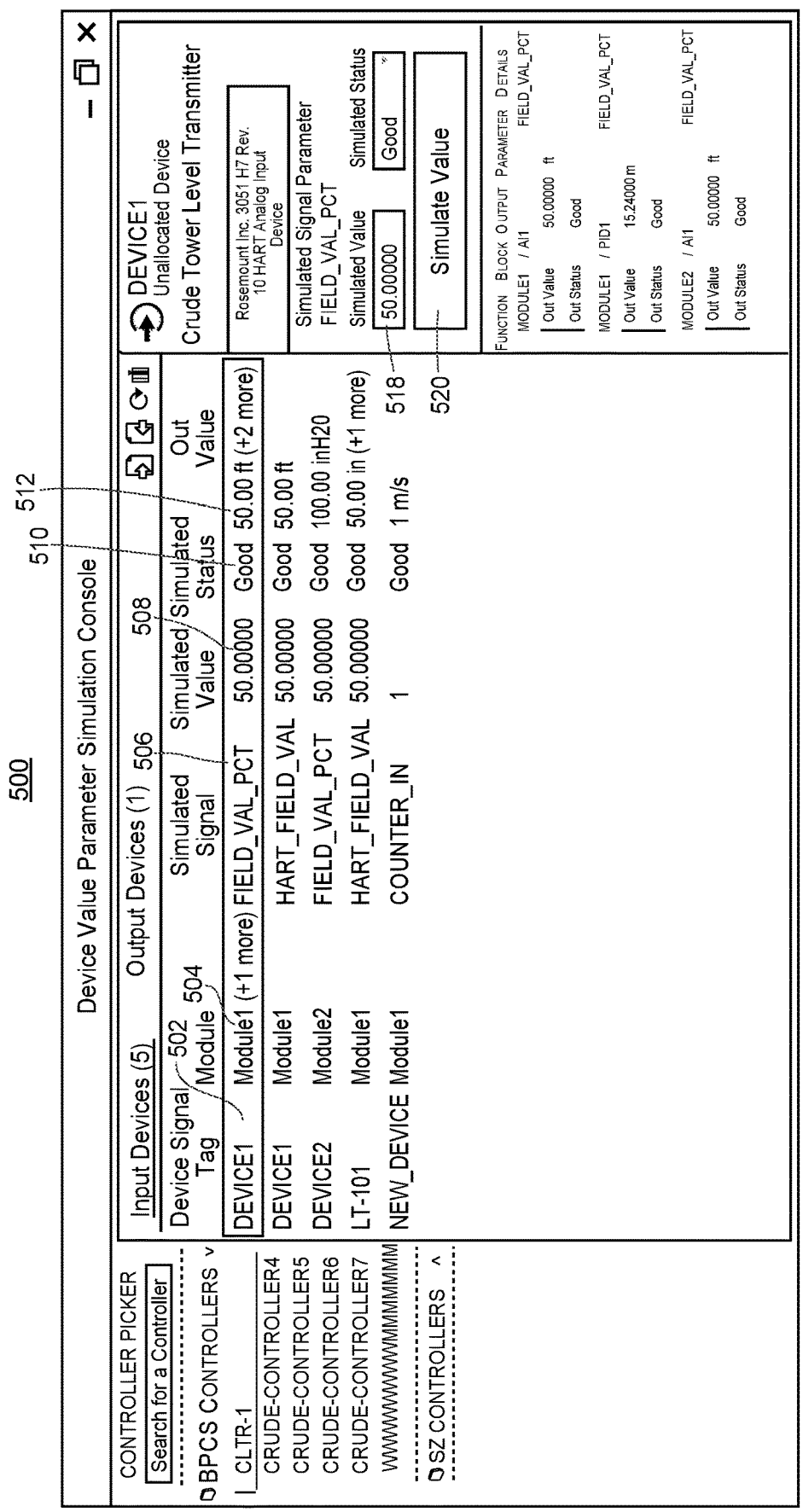
FIG. 5 illustrates an example screen display presented by a simulation application that provides user control to simulate an input value of a virtual DST of the process plant of FIG. 1.

FIG. 5 illustrates an example screen display 500 presented by a simulation application that provides user control to simulate an input value of a virtual DST of the process plant 5 of FIG. 1. The simulation application may include an inputs tab that lists all virtual DSTs included in the one or more control modules implemented by a virtual controller that correspond to input devices. In the illustrated example, the virtual controller implements control modules that include five different virtual DSTs corresponding to various input devices. It should be appreciated that if multiple control modules controlled by the virtual controller include the same DST, the virtual DST is only listed once.

For each of the listed virtual DSTs, the screen display 500 includes an indication of the device to which the virtual DST corresponds (reference 502), an indication of a control module implemented by the virtual controller that references the virtual DST (reference 504), an indication of the signal parameter corresponding to the virtual DST (reference 506), an indication of a simulation value for the virtual DST (reference 508), an indication of a status of the virtual DST (reference 510), and an indication of an output value for the device to which the virtual DST corresponds (reference 512). In one example, each of the values is populated based upon data included in the virtual DST object stored in the configuration database 216 of FIGS. 2A and 2B. It should be appreciated that the indications of the output values may not be populated until the simulation is actually executed.

The screen display 500 further includes one or more user controls to enable the engineer to simulate input values for the listed virtual DSTs. A user control 518 enables the engineer to set a value for the selected input virtual DST. While the user control 518 is illustrated as a text box, the user control 518 may be any type of user interface element that enables an engineer to indicate an input value, such as a drop down box or a radio selection element. In some embodiments, the virtual DSTs are assigned default simulation parameters when the virtual DST is generated. Additionally, a user control 520 enables the simulation application 520 to receive an indication to launch the simulation based on the input value for the virtual DST set via the user control 518.

When the engineer selects the user control 520, the simulation application executes the control modules implemented by the virtual controller. To this end, the simulation application writes the value input via the user control 518 to the virtual DST object for the selected virtual DST stored at the configuration database 216 of FIGS. 2A-2B. As described earlier herein, when the configuration application generated the virtual controller, the configuration application replaced references to DSTs with references to the virtual DSTs. Accordingly, when the simulation application writes the input value to the virtual DST object, the control routines respond to input as if the DST had produced the input value. Accordingly, the simulation in the back-end environment 125 produces the same errors and warnings that would be generated if the control modules were implemented by a controller in a run-time environment 122.

Figure 6:
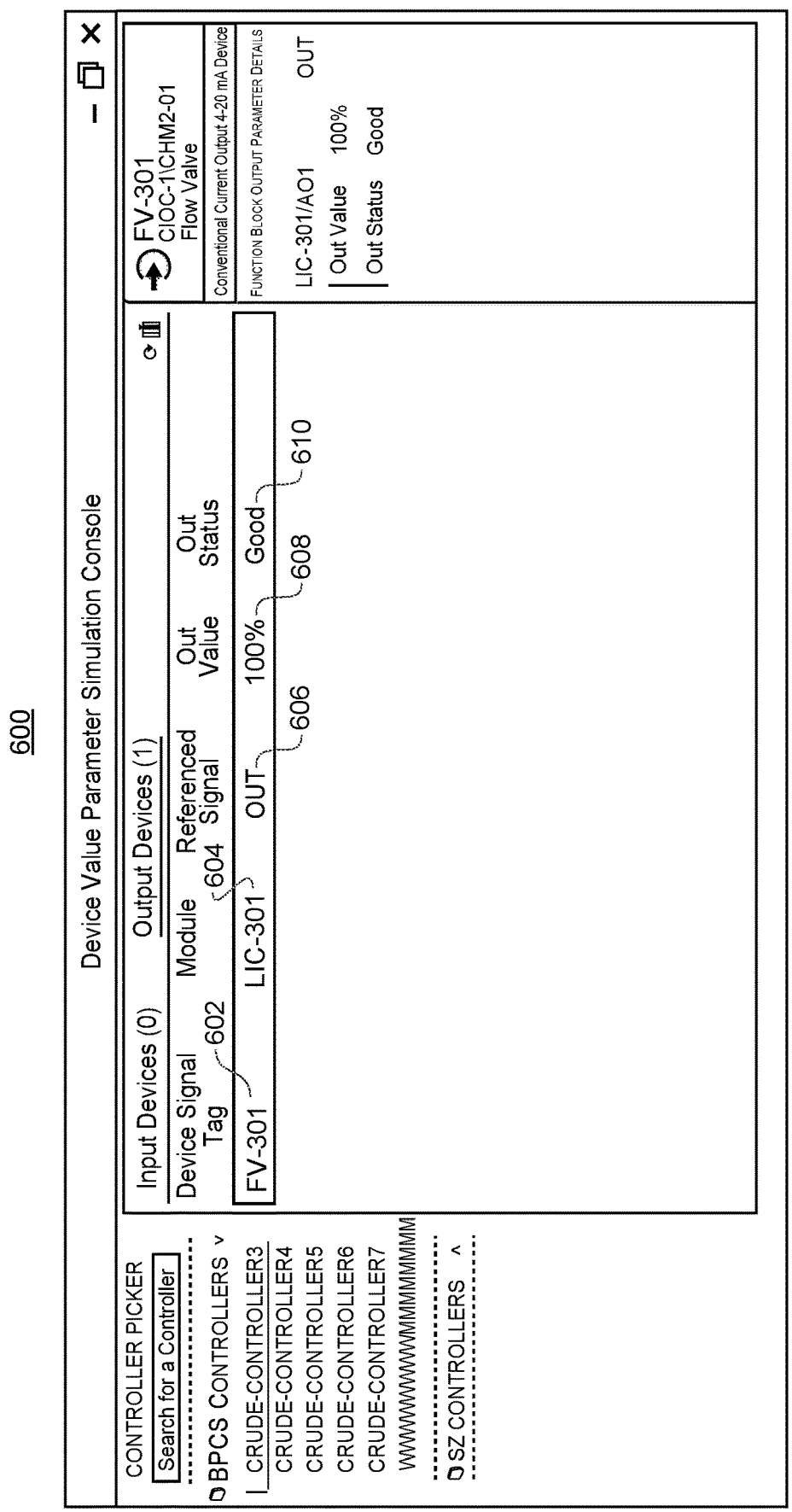
FIG. 6 illustrates an example screen display presented by the simulation application that indicates an output of a virtual controller of the process plant of FIG. 1.

FIG. 6 illustrates an example screen display 600 presented by the simulation application that indicates an output of a virtual controller of the process plant of FIG. 1. The simulation application may include an outputs tab that lists all virtual DSTs included in the control modules implemented by the virtual controller that correspond to output devices. In the illustrated example, the controller implements control modules that include one DST associated with output devices.

For each of the listed virtual DSTs, the screen display 600 includes an indication of the device to which the virtual DST corresponds (reference 602), an indication of a control module implemented by the virtual controller that references the virtual DST (reference 604), an indication of the signal parameter corresponding to the virtual DST (reference 606), an indication of an output value for the virtual DST (reference 608), and an indication of a status of the virtual DST (reference 610). In one example, each of the values is populated based upon data included in the virtual DST object stored in the configuration database 216 of FIGS. 2A-2B.

Figure 7:
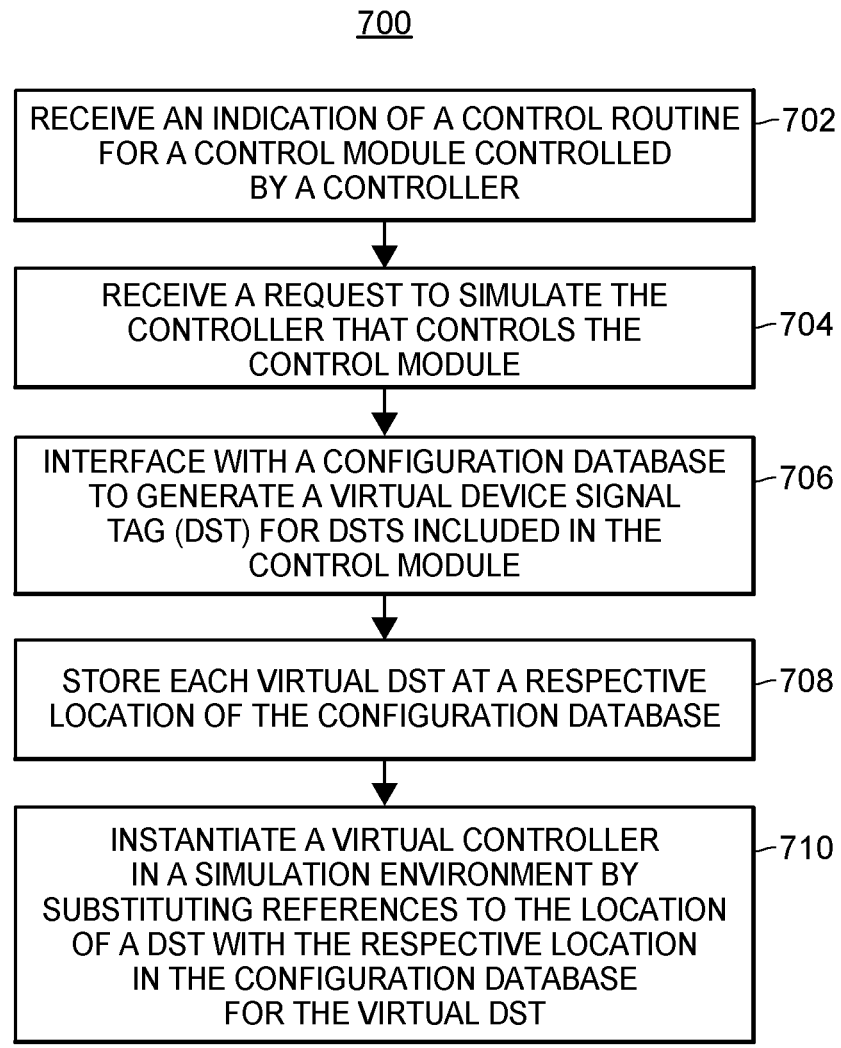
FIG. 7 depicts a flow diagram of an example method of virtualizing I/O devices.

FIG. 7 depicts a flow diagram of an example method 700 for testing or verifying a control routine in a process plant 5. The method 700 may be executed on an operator workstation 71, server, or any other suitable computing device of a back-end environment, such as the back-end environment 125 of FIG. 1 or back-end environment 200 of FIGS. 2A-2B. In some embodiments, the method 700 may be implemented in the configuration application 72b, 210A stored on a non-transitory computer-readable memory and executable on one or more processors of the operator workstation 71, server, or any other suitable computing device. For example, the configuration application 72 may be a configuration application 210A of the control system 210 of FIGS. 2A-2B.

At block 702, the method 700 includes receiving an indication of a control routine or a control module that is to be implemented by a physical controller 11 in the field environment 122. In one embodiment, the configuration application 72 presents the display screen 300 to enable an engineer to design the control routine or module. To this end, the configuration application 72a, 201A enables the engineer to assign and interconnect various function blocks of the control routine or module. In some embodiments, the configuration application 72 may receive an indication of multiple control routines implemented by multiple control modules that are to be controlled by the same physical controller 11 during runtime.

At block 704, the method 700 may include receiving a request to simulate the physical controller 11 that is to execute the indicated control routine(s) and/or control module(s), e.g., by using a virtual controller 236. In one example, the request is received via a controller properties interface presented within the configuration application 72a, 210A, such as the display screen 400 of FIG. 4. In some embodiments, the request includes information detailing a desired software version of the virtual controller 236 and/or a particular environment at a simulation system on which to execute the virtual controller 236.

At block 706, the method 700 may include generating one or more respective virtual I/O objects 234 for one or more DTs and/or DSTs utilized in (e.g., referenced by) the created control routine or control module. In an embodiment, the configuration application 72a, 210A interfaces with a configuration database 216 to generate a respective virtual I/O object 234 for each DT/DST included in the control routine or module. To generate a virtual I/O object 234, the configuration application 72 may first determine whether the respective DT/DST is assigned to a field device with an allocated I/O path, assigned to a field device with an unallocated I/O path, or not assigned to a field device at all. For a DT/DST that is assigned to a field device having an allocated I/O path, the configuration database 216 may include a defined or configured DT/DST object that is representative of the DT/DST. Accordingly, in these types of scenarios, to generate the virtual I/O object 234 for a field device with an allocated I/O path, the configuration application 72a, 210A copies the DT/DST object stored in the configuration database 216 into the respective virtual I/O object 234.

On the other hand, DTs/DSTs that are assigned to field devices without allocated I/O paths and DT/DSTs that are unassigned may instead be represented by respective device placeholder objects 232 stored in an asset object system 230. Accordingly, in some embodiments, to generate the respective virtual I/O objects 234 for unassigned or unallocated DTs/DSTs, the method 700 may include copying the respective device placeholder object(s) 232 stored in the asset object system 230. In some implementations, the asset object system 230 is included in the configuration database 216.

Additionally or alternatively, the configuration database 216 may store template objects for particular types of DTs/DSTs. As such, for some unassigned and/or unallocated DTs/DSTs that are referenced by the control modules or routines that are to be executed by the physical controller 11 during runtime, the configuration application 216 may determine a type of the subject DT/DST. Accordingly, to create a corresponding virtual I/O object 234, the configuration application 216 may create a copy of the template object of the particular type of DT/DST as the corresponding virtual I/O object 234.

Additionally, generating the virtual I/O objects 234 (block 706) may include generating a simulation module for at least one of the virtual I/O objects 234. As described above, a simulation module may enable a virtual I/O object 234 to respond to the virtual controller 236 as if the response was provided by a physical field device. In one embodiment, the configuration database 216 includes template simulation objects that are configured to mimic the performance of particular types of DTs/DSTs. In some cases, the simulation objects also include default simulation values. Accordingly, in an embodiment, when generating the virtual I/O object 234 (block 706), the configuration application 72a, 210A may include or otherwise indicate a particular template simulation object corresponding to the particular type of DT/DST that the virtual I/O object 234 is virtualizing.

At block 708, the method 700 may include storing the generated virtual I/O objects 234 at respective locations in the configuration database 216. To this end, in an example implementation, when the configuration application 72a, 210A stores the virtual I/O objects 234 in the configuration database 216, the configuration application 72a 210A also assigns to each virtual I/O object 234 a path via which the each virtual I/O object 234 may be accessed. In some embodiments, the configuration database 216 includes a dedicated storage area for storing the virtual I/O objects 234. It should be appreciated that any DT/DST object corresponding to a particular virtual object 234 may remain stored in the configuration database 216, and any device placeholder object 232 on which the particular virtual I/O object 234 is based may remain stored in the asset object system 230.

At block 710, the method 700 may include instantiating a virtual controller 236 in a simulation environment by substituting references to the location of a particular DT/DST object with the respective location in the configuration database 216 for its corresponding virtual I/O object 234. To this end, in an embodiment, when setting up or establishing the virtual controller 236 at the simulation system, the configuration application 72a, 210A identifies any reference to an I/O device that is included in the control modules that are assigned to be implemented by the virtualized controller 236. Accordingly, the configuration application 72a, 210A modifies the control modules and/or the function blocks therein to include the respective paths to the virtual I/O objects 234 whenever a path to a DT/DST is required. Thus, the virtual controller 236 responds as if a field device provided response data without having to download the control routines into a physical controller 11, 262.

In some embodiments, the virtual controller 236 is utilized to conduct testing as part of commissioning the back-end environment prior to the controllers and/or field devices being fully commissioned. Accordingly, the engineer may interact with a simulation application to simulate particular input values for virtual I/O objects 234 associated with input devices. As described herein, the simulation application may be a standalone application or a plug-in to the configuration application 72a, 210A. However, even when the simulation application is a standalone application, the same one or more processors that execute the configuration application 72a, 210A also execute the simulation application.

Accordingly, in some embodiments, the simulation application receives an indication of an input value for a particular virtual DST associated with an input device, such as a field device providing an input to the controller. In one embodiment, the input value is received through the screen display 500 of FIG. 5. After receiving the indication of the input value, the simulation application causes the virtual controller 236 to execute a simulation using the input value as the value for an indicated virtual I/O object 234. To this end, in one embodiment, the simulation application writes the input value to the simulation module of the virtual I/O object 234 such that the virtual controller 236 reacts as if the input value was generated by a corresponding field device.

After executing the simulation, in some embodiments, the simulation application presents an indication of a simulated output value for a virtual I/O object 234 associated with an output device, such as the controller providing an output value to a field device. In one example, the output value is presented via the screen display 600 of FIG. 6. The virtual I/O object 234 associated with the output device may also include an output status (e.g., good, bad, caution, high, low, etc.) based on the particular output value. Accordingly, the simulation application may also present an indication of the output status for the virtual I/O object 234 associated with the output device.

It should be appreciated that the virtual controller 236 may reside in the simulation environment until it is explicitly deleted. Accordingly, the commissioning testing using the virtual controller 236 may occur over multiple hours, days, weeks, etc. During this time, the same or different engineer may modify the control modules assigned to the corresponding physical controller 262. For example, an additional control module may be assigned to the physical controller 262, a control module may be unassigned from the physical controller 262, or a control routine for a control module may be modified. After these changes occur, the virtual controller 236 no longer reflects the current configuration of the physical controller 262. Accordingly, the simulation application may monitor the configuration database 216 to detect any changes to the controller object of the physical controller 262 and/or the control modules assigned to the physical controller 262.

Upon detecting a change, in some embodiments, the simulation application presents a notification to an engineer that the simulation should be refreshed to reflect the current configuration of the physical controller 262. Accordingly, the simulation application may receive an indication to refresh the virtual controller 236. In some embodiments, the simulation application directly interacts with the configuration database 72b, 216 to generate the refreshed virtual controller 236. In other embodiments, the simulation application utilizes the configuration application 72a, 210A to refresh the virtual controller 236. After the simulation application refreshes the virtual controller 236, the simulation application may be utilized to execute simulations using the refreshed virtual controller 236.

It is noted that while the I/O virtualization techniques described herein are described with respect to a process control system 5, any one or more of the I/O virtualization techniques described herein are equally applicable to a process control safety information system of a process control plant, such as the DeltaV SIS™ product provided by Emerson Process Management. For example, a standalone process control safety system or an integrated control and safety system ("ICSS") may be commissioned using any one or more of the smart commissioning techniques described herein.

Further, while the I/O virtualization techniques described herein are applied to scenarios where the process control system 5 is in the process of being commissioned, any of the I/O virtualization techniques are equally applicable to fully commissioned process control systems. That is, even in a fully commissioned process plant a configuration engineer may test and/or simulate a change to a controller in a simulated environment without having to download the changes to the controller under test. Further, because, as described herein, the simulated control module does not include special simulation function blocks, the I/O virtualization techniques described herein enable simulation of a controller without modification of production control logic.

Additionally, when implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

Embodiments of the techniques described in the present disclosure may include any number of the following aspects, either alone or combination:

1. A computing device for virtualizing input/output (I/O) of a process controller in a process plant during commissioning of the process plant, the computing device comprising: a configuration database; one or more processors; and a non-transitory computer-readable medium coupled to the configuration database and the one or more processors and storing a configuration application thereon, that when executed by the one or more processors, causes the computing device to: receive an indication of a control module that is to be executed by a process controller in a runtime environment of the process plant; and receive a request to simulate the process controller, and based on the received request: generate, by using the configuration database, a respective virtual device signal tag (DST) for each DST included in the control module; store each virtual DST at a respective location of the configuration database; and instantiate, in a simulation environment, the control module at a virtual controller corresponding to the process controller, including substituting a reference to a respective location of the each DST with the respective location in the configuration database of the each virtual DST.

2. The computing device according to aspect 1, wherein a first particular DST included in the control module is allocated to a field device; and the respective virtual DST of the first particular DST comprises a copy of data stored in an instance of a DST object corresponding to the first particular DST and configured for the field device.

3. The computing device according to any one of the preceding aspects, wherein a second particular DST included in the control module is one of: not allocated to any field device, or not assigned to any field device; and the respective virtual DST of the second particular DST comprises a copy of a template object corresponding to a type of the second particular DST, the copy of the template object storing default parameter values.

4. The computing device according to any one of the preceding aspects, wherein the computing device is communicatively connected to an asset object system of the process plant, the asset object system storing device placeholder objects.

5. The computing device of according to any one of the preceding aspects, wherein a third particular DST included in the control module is not allocated to any field device; and the respective virtual DST of the third particular DST comprises a copy of a device placeholder object for the third particular DST stored in the asset object system.

6. The computing device according to any one of the preceding aspects, wherein a fourth particular DST included in the control module is not assigned to any field device; and the respective virtual DST of the fourth particular DST comprises a copy of a device placeholder object for the fourth particular DST stored in the asset object system.

7. The computing device according to any one of the preceding aspects, wherein the configuration application further causes the computing device to receive an indication of an input value for the control module; and simulate the process controller executing the control module by providing the input value to a virtual DST associated with an input to the virtual controller.

8. The computing device according to any one of the preceding aspects, wherein the simulation of the process controller executing the control module generates an output value via a virtual DST associated with an output of the virtual controller, the output value generated by the virtual controller based on the input value.

9. The computing device according to any one of the preceding aspects, wherein the configuration application further causes the computing device to download the control routine into the process controller.

10. A method for virtualizing input/output (I/O) of a module in a process plant, the comprising receiving, by one or more processors executing at least a configuration application, an indication of a control module that is to be executed by a process controller in a runtime environment of the process plant; and receiving, by the one or more processors, a request to simulate the process controller, and upon receiving the request: generating, by accessing the configuration database, a respective virtual device signal tag (DST) for each DST included in the control module; storing each virtual DST at a respective location of the configuration database; and instantiating the control module at a virtual controller corresponding to the process controller, including substituting a reference to a respective location of the each DST with the respective location in the configuration database of the each virtual DST.

11. The method according to aspect 10, wherein a first particular DST included in the control module is allocated to a field device; and generating the respective virtual DST of the first particular DST comprises generating a copy of data stored in an instance of a DST object corresponding to the first particular DST and configured for the field device.

12. The method according to any one of aspects 10-11, wherein a second particular DST included in the control module is not allocated to any field device; and generating the respective virtual DST of the second particular DST comprises generating a copy of a template object corresponding to a type of the second particular DST, the copy of the template object storing default parameter values.

13. The method according to any one of aspects 10-12, wherein a third particular DST included in the control module is not allocated to any field device; and generating the respective virtual DST of the third particular DST comprises generating a copy of a device placeholder object for the third particular DST stored in an asset object system.

14. The computing device according to any one of aspects 10-13 wherein a fourth particular DST included in the control module is not assigned to any field device; and generating the respective virtual DST of the fourth particular DST comprises generating a copy of a device placeholder object for the fourth particular DST stored in an asset object system.

15. The method according to any one of aspects 10-14, further comprising receiving, by the one or more processors, an indication of an input value for the control module; and simulating the process controller executing the control module by providing the input value to a virtual DST associated with an input to the virtual controller.

16. The method according to any one of aspects 10-15, wherein the simulating the process controller executing the control module comprises obtaining an output value via a virtual DST associated with an output of the virtual controller, the output value generated by the virtual controller based on the input value.

17. The method according to any one of aspects 10-16, further comprising detecting, by the one or more processors, a change to the control module; and refreshing, by the one or more processors, the virtual controller to include the detected change; and executing, by the one or more processors, an updated simulation using the refreshed virtual controller.

18. The method according to any one of aspects 10-17, further comprising downloading, by the one or more processors, the control routine into the process controller.

What is claimed:

1. A computing device for virtualizing input/output (I/O) of a process controller in a process plant during commissioning of the process plant, the computing device comprising:
    a configuration database;
    one or more processors; and
    a non-transitory computer-readable medium coupled to the configuration database and the one or more processors and storing a configuration application thereon, that when executed by the one or more processors, causes the computing device to:
        receive an indication of a control module that is to be executed by a process controller in a runtime environment of the process plant; and
        receive a request to simulate the process controller, and based on the received request:
            generate, by using the configuration database, a respective virtual device signal tag (DST) for each DST included in the control module;
            store each virtual DST at a respective location of the configuration database; and
            instantiate, in a simulation environment, the control module at a virtual controller corresponding to the process controller, including substituting a reference to a respective location of the each DST with the respective location in the configuration database of the each virtual DST.

2. The computing device of claim 1, wherein:
    a first particular DST included in the control module is allocated to a field device; and
    the respective virtual DST of the first particular DST comprises a copy of data stored in an instance of a DST object corresponding to the first particular DST and configured for the field device.

3. The computing device of claim 1, wherein:
    a second particular DST included in the control module is one of: not allocated to any field device, or not assigned to any field device; and
    the respective virtual DST of the second particular DST comprises a copy of a template object corresponding to a type of the second particular DST, the copy of the template object storing default parameter values.

4. The computing device of claim 1, wherein the computing device is communicatively connected to an asset object system of the process plant, the asset object system storing device placeholder objects.

5. The computing device of claim 1, wherein the configuration application further causes the computing device to:
    receive an indication of an input value for the control module; and
    simulate the process controller executing the control module by providing the input value to a virtual DST associated with an input to the virtual controller.

6. The computing device of claim 1, wherein the configuration application further causes the computing device to download the control routine into the process controller.

7. The computing device of claim 4, wherein:
    a third particular DST included in the control module is not allocated to any field device; and
    the respective virtual DST of the third particular DST comprises a copy of a device placeholder object for the third particular DST stored in the asset object system.

8. The computing device of claim 4, wherein:
    a fourth particular DST included in the control module is not assigned to any field device; and
    the respective virtual DST of the fourth particular DST comprises a copy of a device placeholder object for the fourth particular DST stored in the asset object system.

9. The computing device of claim 4, wherein:
    a fourth particular DST included in the control module is not assigned to any field device; and
    generating the respective virtual DST of the fourth particular DST comprises generating a copy of a device placeholder object for the fourth particular DST stored in an asset object system.

10. The computing device of claim 5, wherein the simulation of the process controller executing the control module generates an output value via a virtual DST associated with an output of the virtual controller, the output value generated by the virtual controller based on the input value.

11. A method for virtualizing input/output (I/O) of a module in a process plant, the comprising:
    receiving, by one or more processors executing at least a configuration application, an indication of a control module that is to be executed by a process controller in a runtime environment of the process plant; and
    receiving, by the one or more processors, a request to simulate the process controller, and upon receiving the request:
        generating, by accessing the configuration database, a respective virtual device signal tag (DST) for each DST included in the control module;
        storing each virtual DST at a respective location of the configuration database; and
        instantiating the control module at a virtual controller corresponding to the process controller, including substituting a reference to a respective location of the each DST with the respective location in the configuration database of the each virtual DST.

12. The method of claim 11, wherein:

a first particular DST included in the control module is allocated to a field device; and generating the respective virtual DST of the first particular DST comprises generating a copy of data stored in an instance of a DST object corresponding to the first particular DST and configured for the field device.

13. The method of claim 11, wherein:

a second particular DST included in the control module is not allocated to any field device; and generating the respective virtual DST of the second particular DST comprises generating a copy of a template object corresponding to a type of the second particular DST, the copy of the template object storing default parameter values.

14. The method of claim 11, wherein:

a third particular DST included in the control module is not allocated to any field device; and generating the respective virtual DST of the third particular DST comprises generating a copy of a device placeholder object for the third particular DST stored in an asset object system.

15. The method of claim 11, further comprising:

receiving, by the one or more processors, an indication of an input value for the control module; and simulating the process controller executing the control module by providing the input value to a virtual DST associated with an input to the virtual controller.

16. The method of claim 11, further comprising:

detecting, by the one or more processors, a change to the control module; and refreshing, by the one or more processors, the virtual controller to include the detected change; and executing, by the one or more processors, an updated simulation using the refreshed virtual controller.

17. The method of claim 11, further comprising downloading, by the one or more processors, the control routine into the process controller.

18. The method of claim 15, wherein the simulating the process controller executing the control module comprises obtaining an output value via a virtual DST associated with an output of the virtual controller, the output value generated by the virtual controller based on the input value.

* * * * *